United States Patent [19]

Pasuit et al.

[11] Patent Number: 5,391,224
[45] Date of Patent: Feb. 21, 1995

[54] AQUEOUS-BASED STOP-LEAK FORMULATION

[75] Inventors: Joseph E. Pasuit, Goodrich; James J. Stevens, Cheboygan, both of Mich.

[73] Assignee: Fre-Bar Inc., Holly, Mich.

[21] Appl. No.: 272,013

[22] Filed: Jul. 8, 1994

[51] Int. Cl.⁶ ............................................... C09K 3/12
[52] U.S. Cl. .................................. 106/33; 106/15.05; 106/159; 252/72
[58] Field of Search ............... 106/14.13, 14.15, 14.16, 106/14.42, 15.05, 33, 159; 252/72; 424/195.1

[56] References Cited

U.S. PATENT DOCUMENTS

| | | | |
|---|---|---|---|
| Re. 24,094 | 11/1955 | Barton | 106/33 |
| 1,630,828 | 5/1927 | Campbell | 106/33 |
| 2,935,189 | 5/1960 | Barton | 206/47 |
| 3,322,548 | 5/1967 | Lasswell et al. | 106/33 |
| 4,348,235 | 9/1982 | Lasswell et al. | 106/33 |
| 4,662,940 | 5/1987 | Monier | 106/33 |
| 5,282,895 | 2/1994 | Phillips | 106/33 |

*Primary Examiner*—Mark L. Bell
*Assistant Examiner*—Michael Marcheschi
*Attorney, Agent, or Firm*—Gifford, Krass, Groh, Sprinkle, Patmore, Anderson & Citkowski

[57] ABSTRACT

A storage-stable, stop-leak formulation contains a ground plant root material, an alkaline metal salt of a C1–C3 carboxylic acid and water. The formulation may further include corrosion inhibitors, biocides, lubricating agents, dyes and the like. Typically, the stop-leak formulation includes 1–50 parts by weight of the root powder, 1–15% by weight of the salt and 120–180 parts by weight of water. Preferably the root powder is ginger root powder and the salt is potassium acetate.

13 Claims, No Drawings

AQUEOUS-BASED STOP-LEAK FORMULATION

FIELD OF THE INVENTION

This invention relates generally to formulations for sealing leaks in fluid handling systems. More specifically, the invention relates to compositions for sealing leaks in heat exchange systems. Most specifically, the invention relates to an aqueous-based formulation for sealing leaks in vehicular heat exchange systems of the type which include a radiator.

BACKGROUND OF THE INVENTION

Heat exchange systems such as those found in motor vehicles include a long and complex fluid flow path in order the maximize heat transfer therethrough. A typical motor vehicle includes a radiator which comprises a metallic member having a complex, high surface area fluid flow path. The radiator is usually made from relatively thin metal and includes a number of soldered or welded joints. Vehicular cooling systems are prone to leak because of the corrosive environment and high degree of mechanical stress to which they are subject, leaks present a serious problem because they can compromise the efficiency of the heat exchanger and cause catastrophic thermal damage to the engine of the vehicle.

A number of materials have heretofore been employed for the purpose of sealing small leaks in vehicular cooling systems. These sealing compositions typically include a fine, particulate material therein which is forced, by the pressurized fluid in the cooling system through a leaking region. The particulate material is caught in, and seals, the leak. A number of vegetable root powders have been employed in stop leak compositions because they are of relatively low cost and are efficient at sealing leaking cooling systems. U.S. Pat. No. Re. 24,094 discloses a stop-leak formulation comprising an anhydrous mixture of ginger root powder dispersed in a water soluble oil. The mixture is poured into the radiator and the combination of heat and pressure disperses the oil and causes the root powder to swell and seal leaks. While this material is effective, the composition is not stable on storage, since the presence of water will cause the root powder to swell and agglomerate in the container prior to use. U.S. Pat. No. 2,935,189 discloses one approach to overcoming the problem of agglomeration. As disclosed therein, the root powder is mixed with a small amount of soluble oil and formed into pellets which are coated with an oil insoluble, water soluble polymer. The coated pellets are stored under oil. This formulation does increase shelf life somewhat, but any traces of water in the formulation will still cause deterioration and swelling of the pellets. U.S. Pat. No. 3,616,896 discloses a dual container which includes a first compartment holding a dry stop leak material and a second compartment which contains a heat exchange liquid. The contents of the two compartments are mixed just prior to use. The cost and complexity of the package has precluded widespread commercial use.

In another approach, as detailed in U.S. Pat. No. 2,935,189 employs coated pellets of solid stop leak material. These pellets are still water sensitive and have not gained commercial popularity.

In addition to the problem of water sensitivity, prior art oil-based compositions have encountered further problems. In general, consumers are adverse to placing oil-based materials into the cooling systems of their automobiles. The soluble oil can give an opaque appearance to the cooling system fluid, and can separate to generate an oil layer at the top of the fluid level. The appearance of the cooling fluid and the presence Of the oil has led consumers to the belief that the fluid, or the vehicle has been damaged and causing them to drain causing them to and flush their cooling systems and refrain from repurchase of the product. Additionally, the presence of the oil in the cooling fluid presents an environmental hazard and further complicates disposal of spent cooling fluid.

In an attempt to provide an oil-free, storage stable stop leak composition, the prior art has investigated the use of glycol-based root powder formulations. As disclosed in U.S. Pat. No. 5,282,895, the disclosure of which is incorporated herein by reference, a shelf stable aqueous stop leak formulation is comprised of root powder dispersed in a mixture of water and high-boiling glycol or glycol ether. While this formulation is fairly stable, and effective at stopping leaks, it would be desirable to find a replacement for the glycol. The glycol material is somewhat toxic, and is a particular hazard to small children and household pets because of its sweet taste. Additionally, the glycol is a relatively expensive material.

Clearly, it would be desirable to have a stop leak formulation which does not include any oil or glycols therein, but which is storage stable and not prone to freezing under normally encountered shipping and handling conditions. It is also essential that the composition not react adversely with rubber, steel, aluminum, brass, copper and other materials typically found in vehicular cooling systems. It would also be most advantageous if the material were relatively low in cost. As will be described in greater detail hereinbelow, the present invention provides a stop leak composition particularly useful for the cooling systems of motor vehicles. The stop leak composition includes no oil, glycol or ethers. It is freeze protected and storage stable and of low cost and toxicity. These and other advantages of the present invention will be readily apparent from the discussion and description which follow.

BRIEF DESCRIPTION OF THE INVENTION

There is disclosed herein a substantially oil-free, storage-stable, aqueous-based stop-leak formulation for use in a heat exchange system. The preferred formulation consists essentially of: 1–50 parts by weight of a plant root powder; 1–15 parts by weight of a salt of a C1–C3 carboxylic acid and 120–180 parts by weight of water. In a particular embodiment, the acid is acetic acid. In one particular embodiment, the salt comprises potassium acetate. The root powder comprises a member selected from the group consisting of: ginger root, orris root, turmeric root, blood root, licorice root, poke root, sasparilla root, and combinations thereof. In one specific embodiment, the root powder comprises ginger root powder having a particle size in the range of 200–2,000 microns.

The composition may further include ancillary ingredients such as biocides, dyes, lubricants and corrosion inhibitors. In one particularly preferred formulation, the stop-leak composition includes 15–30 parts by weight of powdered ginger root, 2–10 parts by weight of potassium acetate and 130–150 parts by weight of water. The present invention also includes a method for the stopping of leaks in the cooling of a motor vehicle. The method includes the step of adding the composition of the present invention to the heat exchange fluid of the cooling system; and, circulating the heat exchange fluid containing the stop-leak formulation throughout the cooling system of the vehicle so as to transport the root powder to any leaks which may be present.

DETAILED DESCRIPTION OF THE INVENTION

In general, the formulation of the present invention comprises a plant root powder together with a salt of a C1–C3 carboxylic acid and water. The composition may further include ancillary ingredients such as biocides, lubricants, corrosion inhibitors and dyes. It is notable that the material of the present invention is oil free and that it need not incorporate any glycol or glycol ether therein.

Among the root powders which may used in the practice of the present invention are: ginger root, orris root, turmeric root, blood root, licorice root, poke root and sasparilla root. The materials may be used either singly or in combination and are preferably present in the form of a relatively fine powder having a fairly broad distribution of particle sizes. The root powder is carried with the cooling fluid and is forced into leaks in the cooling system so as to close or stop the leak. It will be appreciated that if the particle size is too small, the root powder will merely pass through most leaks; whereas if the particle size is too large, the root powder may actually plug the cooling passages through the heat exchange system. In general it has been found that particles within the size range of approximately 200 microns to about 2,000 microns are most effective.

The root powder material may be in the form of a loose powder, or it may be compacted into pellets, briquettes or the like; however, any pellets which are employed should be fabricated with a binder or coating which will break down under conditions of use encountered in the cooling system, so as to release free particles thereinto. Ginger root powder comprises one particularly preferred root powder.

The carboxylic acid salt is an important ingredient of the present invention, and is responsible for the stability of the composition. The salt also depresses the freezing point of the water so as to prevent freezing of the composition during shipping and handling under cold conditions. In general, it is preferred that the salt comprises a metal salt, and most preferably an alkali or alkaline earth metal salt, of a C1–C3 carboxylic acid. The salt should be water soluble, stable, non-toxic and non-corrosive to cooling system components under normally encountered conditions of use. Most preferably, the salt is the calcium, sodium or potassium salt of the acid. Most preferably, the acid is acetic acid, although it is to be understood that formic acid or propionic acid may be employed in some instances.

Even at relatively low concentrations, these salts will depress the freezing point of the water-root powder mixture sufficiently to permit cold climate shipping and storage. The salts have low toxicity to animal and plant life and are stable and non-corrosive to most metals and polymers.

The composition also includes water, and it is generally preferred that the water have a relatively low concentration of dissolved alkalis, acids or other minerals so as to prevent unwanted reaction with the salt or root powder, or the formation of mineral deposits within the cooling system. Deionized water, or good quality tap water, is preferred.

The composition of the present invention may also include a number of other ingredients. These ingredients are not essential to the leak stopping function, or to the storage stability of the composition and hence are referred to herein as ancillary ingredients. Among such ingredients are biocides, lubricants, corrosion inhibitors, dyes and the like. Biocides act as preservatives which prevent the growth of molds, yeasts, fungus or bacteria in the composition during storage. Such materials are well known in the art and may include organic and inorganic materials. One particularly preferred biocide comprises a hexahydro- 1-2-5 tris (2-hydroxyethyl)-s-triazine solution sold the L&F products company of Montvale, N.J. under the name Grotan®. Other biocides having utility in the present invention include products sold under the names: Dowicil® by the Dow Chemical Company; Biobon® by the Angus Chemical Company of Northbrook, Ill., and Busan® by Buckman Laboratories of Tennessee. In some instances mixtures of biocides may be employed and one preferred mixture includes the Grotan® and Dowicil® biocides described above. The stop-leak formulations may also include corrosion inhibitors or chelating agents which sequester metallic ions (especially copper ions) which could plate to aluminum in the cooling system thereby fostering corrosion. Among some of the preferred corrosion inhibitors are benzotriazole, tolyltriazole and other triazole derivatives.

The stop-leak formulations may also include materials for lubricating bearings, seals and other components of the cooling system. Such lubricating agents include phosphate esters such as anionic or nonionic phosphate surfactants. If used, the lubricating agents are present at a level of about 0.5–10% on a weight basis. In many instances, lubricants and corrosion inhibitors will be present in antifreeze compositions already present in the cooling system, and need not be included in the stop-leak formulation of the present invention.

The stop-leak formulation of the present invention may also include a dye in order to enhance the consumer appeal of the product and to permit easy visualization of any unsealed leaks in the cooling system. It has been found that highly fluorescent materials such as the fluorescein dyes are particularly advantageous for this application.

The materials of the present invention may be formulated over a relatively broad compositional range. In general, it has been found that approximately 20 grams of root powder material is sufficient to treat the cooling system of a typical automobile. The composition should include sufficient water to enable ready dispersion of the root powder therein by shaking, and should further include a sufficient amount of the salt to lower the freezing point to a degree adequate to prevent freezing during cold weather shipping and to prevent unwanted agglomeration of the root powder during storage. Most preferably, it has been found that stop-leak formulations of the present invention include 1–50 parts by weight of the root powder; 1–15 parts by weight of the salt and 120–180 parts by weight of water; and as noted above, the formulations may further include a number of ancillary ingredients.

One particularly preferred composition includes 15–30 parts by weight of ginger root powder having a particle size range of approximately 200–2,000 microns; 2–10 parts by weight of potassium acetate and 130–150 parts by weight of water together with 0.1 to 1.0% by weight of the Grotan ® biocide. The compositions are prepared by simply mixing the ingredients together to form a homogenous mixture and dispensing the mixture into containers. There is some tendency for the root powder to settle, and care should be taken to assure that uniform amounts are distributed to each of the containers. Alternatively, the root material may be dispensed directly into a container, and the liquid components added thereto. One fairly typical composition comprises approximately 1 gram of root material to about 8 grams of the water and salt mixture.

The stop-leak formulations of the present invention are storage stable over long periods of time. The composition of the present invention retains its leak-stopping ability after over two years of shelf storage, and even though the root powder may settle, it may be readily redispersed by gentle shaking. This is in direct contrast to prior art root powder formulations which, even after only relatively short storage times in the presence of traces of water, agglomerate and cannot be redispersed.

The calcium, sodium and potassium salts of C1–C3 carboxylic acids comprise commercially available solid materials, and the present invention may be prepared utilizing such materials. However, in many instances it will be more economical to generate the salt in situo by direct reaction of the acid and base so as to form a stock solution which may be utilized in the preparation of the stop-leak formulation.

The following example illustrates one particular embodiment of the present invention.

EXAMPLE

A stock solution of potassium acetate was prepared by direct reaction of potassium hydroxide and acetic acid. 3,658.2 pounds of glacial acetic acid (98%) was charged into a 1,000-gallon stainless steel, water cooled mixing tank. 7,261.8 pounds of a 45% aqueous solution of potassium hydroxide, was slowly added to the acetic acid with stirring. The temperature of the acid was monitored, and the rate of addition controlled so as to maintain the temperature at 160° F. or lower. When the addition was complete, the material was analyzed and it was found to comprise 10,920 pounds of a 55 % solution of potassium acetate in water.

The thus prepared concentrate was utilized to formulate a stock solution. Approximately 5,200 pounds of water was added to a 1,000-gallon, stainless steel mixing tank. 687.2 pounds of the previously prepared concentrate was then added to the tank and mixed. After ten minutes of mixing, 12.9 pounds of Grotan ® biocide, was added and the mixture stirred for another ten minutes. The sample was analyzed and found to contain approximately 4.4 % potassium acetate, approximately 0.15% biocide and the remainder water. Density of the material was 1.03 g/ml at 68° F. and no significant compositional change was noted over two years of storage time.

The stock solution was subsequently mixed with root powder to produce a stop-leak formulation. Ten pounds of ginger root powder having a particle size range of approximately 200–2,000 microns was stirred into 80 pounds of the stock solution at room temperature to produce a homogeneous suspension. Stirring was maintained while the material was transferred to individual containers, each holding approximately 6.5 fluid ounces. The resulting formulation was found to be effective as a stop-leak product for motor vehicle cooling systems. The formulation did not freeze at 0° F. Samples of the material were stored at room temperature for extended periods of time and periodically shaken to determine if the root powder remained dispersible. Even after six months of storage it was found that the powder was readily dispersed.

It is found that sodium acetate provides a very similar composition, as do the salts or propionic and formic acid. As has been explained above, a variety of ancillary ingredients may be readily incorporated into the compositions of the present invention. Also, while ginger root is a preferred root powder material, other vegetable root powders are found to have similar performances in the practice of the present invention. Thus, it will be appreciated that the invention may be practiced in a variety of forms other than those specifically discussed herein. Due to the foregoing, it is to be understood that the discussion, description and examples set forth hereinabove are illustrative of, and not limitations upon the practice of the present invention. It is the following claims, including all equivalents, which define the scope of the invention.

We claim:

1. A substantially oil-free, storage-stable, aqueous-based, stop-leak formulation for use in a heat exchange system, said formulation consisting essentially of:
   1–50 parts by weight of a plant root powder;
   1–15 parts by weight of an alkali or alkaline earth metal salt of a C1–C3 carboxylic acid; and
   120–180 parts by weight of water.

2. A formulation as in claim 1, wherein said carboxylic acid is acetic acid.

3. A formulation as in claim 1, wherein said plant root powder is selected from the group consisting of: ginger root, orris root, turmeric root, blood root, licorice root, poke root, sasparilla root, and combinations thereof.

4. A formulation as in claim 1, wherein said plant root powder is ginger root.

5. A formulation as in claim 4, wherein the particle size of the ginger root powder is in the range of approximately 200–2,000 microns.

6. A formulation as in claim 1, further consisting essentially of an ancillary material selected from the group consisting of: biocides, dyes, lubricants, corrosion inhibitors, and combinations thereof.

7. A formulation as in claim 1, consisting essentially of: 15–30 parts by weight of said plant root powder; 2–10 parts by weight of said salt and 130–150 parts by weight of water.

8. A formulation as in claim 1, further consisting essentially of a corrosion inhibitor selected from the group consisting of: benzotriazole, tolytriazole, triazole derivatives, and combinations thereof, and is present in the amount of 0.05–0.5 % by weight.

9. A formulation as in claim 1, further including phosphate ester lubricating agent in the amount of 0.5–10 weight percent.

10. A formulation as in claim 1, wherein said alkali or alkaline earth metal is selected from the group consisting of calcium, sodium and potassium.

11. A formulation as in claim 1, wherein said salt is potassium acetate.

12. A substantially oil-free, storage-stable, aqueous-based, stop-leak formulation for use in a heat exchange system, said formulation consisting essentially of:
   1–50 parts by weight of a plant root material selected from the group consisting of: ginger root, orris root, turmeric root, blood root, licorice root, poke root, sasparilla root, and combinations thereof;

1-15 parts by weight of potassium acetate; and 120-180 parts by weight of water.

13. A method for stopping leaks in a motor vehicle cooling system which includes a radiator and a water-based heat exchange fluid, said method comprising the steps of:

i) adding an effective amount of a substantially oil-free, shelf-stable, aqueous-based stop-leak formulation to the heat exchange fluid of said vehicle to stop leaks therein, wherein the stop-leak formulation consists essentially of:

a) 1-50 parts by weight of a plant root powder selected from the group consisting of: ginger root, orris root, turmeric root, blood root, licorice root, poke root, sasparilla root, and combinations thereof;

b) 1-15 parts by weight of potassium acetate; and 120-180 parts by weight of water; and ii) circulating the water-based heat exchange fluid containing the stop-leak formulation through the motor vehicle cooling system at the normal operating temperature of the motor vehicle cooling system, whereby the plant root powder is transported to leaks within the motor vehicle cooling system.

* * * * *